May 16, 1933.    B. G. LA BAR    1,909,112
ELECTRICAL MEASURING INSTRUMENT
Original Filed July 27, 1927
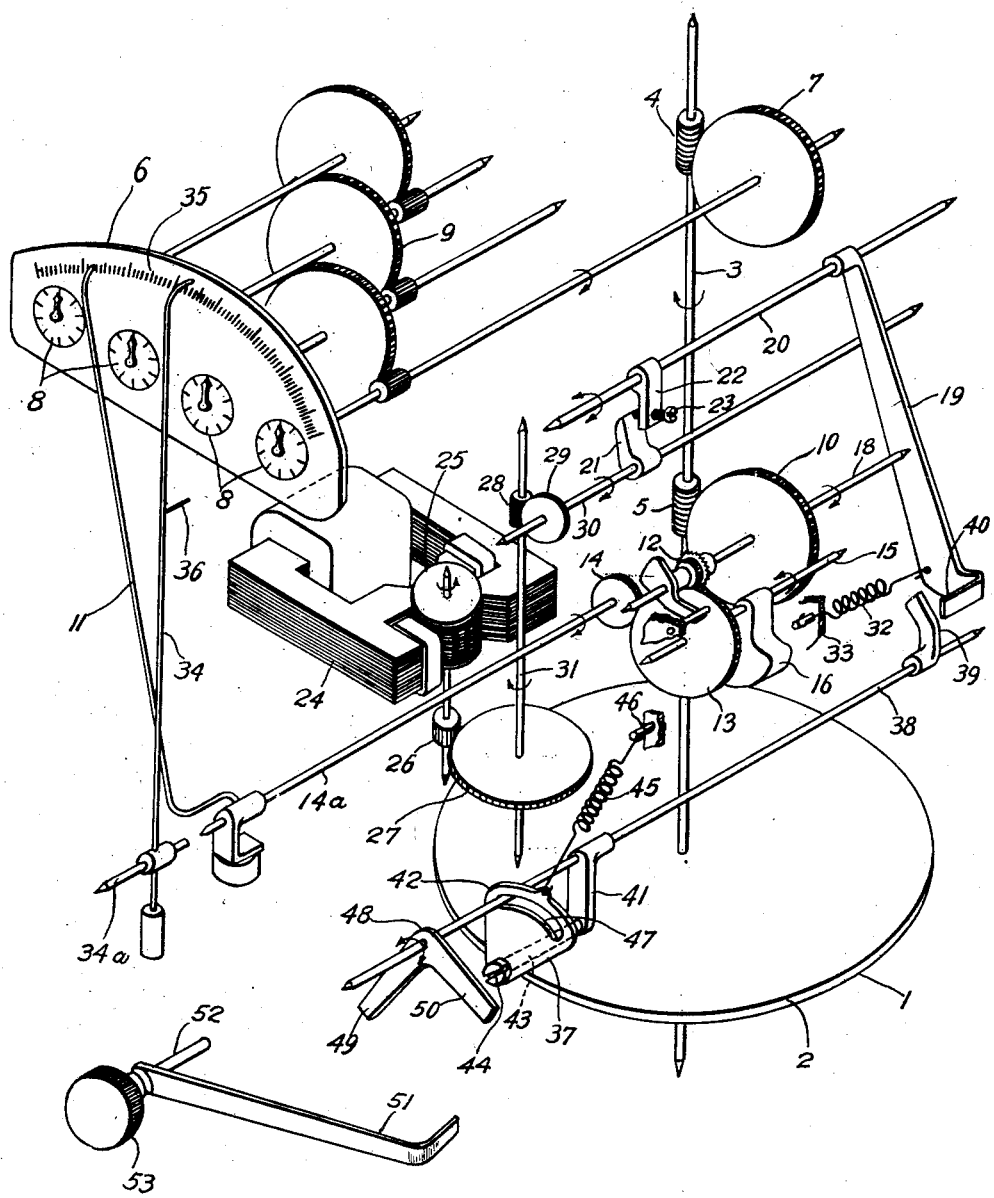
INVENTOR
Bert G. La Bar
BY
ATTORNEY Patented May 16, 1933

1,909,112

UNITED STATES PATENT OFFICE

BERT G. LA BAR, OF TURTLE CREEK, PENNSYLVANIA, ASSIGNOR TO WESTINGHOUSE ELECTRIC & MANUFACTURING COMPANY, A CORPORATION OF PENNSYLVANIA

ELECTRICAL MEASURING INSTRUMENT

Application filed July 27, 1927, Serial No. 208,763. Renewed November 4, 1930.

My invention relates to electrical measuring instruments and more particularly to maximum-demand meters for measuring the demand of a quantity, such as power traversing an electrical circuit.

A present form of maximum-demand meter comprises a pointer that is driven by a watthour-meter element for periodic equal intervals of time over the face of an indicating scale. It is customary, in instruments of this type, to provide an indicating pointer that is adapted to be moved by the demand pointer to a position indicative of a maximum position attained by the demand pointer. In such a device, the demand pointer is periodically returned to zero by a clock or a synchronous motor. It occasionally becomes desirable to re-set both the demand pointer and the indicating pointer at the same time, regardless of the position of the demand pointer.

My invention resides in apparatus for returning both the indicating pointer and the demand pointer to an initial position at any time regardless of the position of either pointer.

It is characteristic of my invention for the above indicated purpose that the driving connection between the watthour-meter element and the demand pointer is entirely disconnected and held in disconnected position during the re-setting operation. It is further characteristic of my invention that, upon completion of the re-setting operation, a driving connection between the watthour-meter element and the demand pointer is immediately reestablished.

Apparatus for the above indicated purpose, constructed in accordance with my invention, is illustrated in the accompanying drawing and described as follows:

The single figure of the accompanying drawing is a diagrammatic perspective view of a portion of a demand meter having a re-setting device embodied therein, in accordance with my invention.

Referring to the drawing, the armature of an electrical measuring instrument, such as a watthour meter 1, consisting of a copper or aluminum disk 2, is adapted to be rotated at a rate proportional to the power traversing an electrical circuit, (not shown) by means of the well known interaction between the current and voltage fluxes emanating from cores (not shown) mounted adjacent to the disk 2. The disk 2, in accordance with the usual construction, is mounted on a rotatable shaft 3 that is provided with worm pinions 4 and 5. The rotation of the armature of the watthour meter 1 may be integrated, in a well known manner, by a dial register 6, the hands or pointers of which are driven by a worm pinion 4 and a worm wheel 7 through a train of gears 9.

The worm pinion 5 meshes with a worm wheel 10 that actuates a demand pointer 11 through a pinion 12, a gear wheel 13, a pinion 14 and a shaft 14a. The shaft 15 of the gear wheel 13 is provided with a weighted member 16 that is adapted to return the demand pointer 11 to a predetermined initial position when the connection between the worm pinion 5 and the worm wheel 10 is broken, in a manner that will be more fully set forth hereinafter.

The worm wheel 10 is mounted on a shaft 18 that has an end bearing in an arm 19 that is, in turn, secured to a shaft 20. A counter-clockwise motion of the arm 19 upon the shaft 20 will lift the shaft 18 to disconnect the worm wheel 10 from the worm pinion 5.

Such motion of the arm 19 is made at the end of predetermined equal intervals of time, in any suitable manner as, for example, by means of an arm 21 that is rotated, at a constant speed, to periodically engage an arm 22 that is secured to the shaft 20. The arm 22 is provided with an adjustable screw 23 for varying the period of contact between the arm 21 and the arm 22.

The arm 21 may be rotated at a constant speed in any suitable manner, as, for example, by a constant-speed motor 24 having an armature 25 that drives the arm 21 through a pinion 26, a gear wheel 27, a worm pinion 28 and a worm wheel 29 mounted on a shaft 30 having the arm 21. The worm pinion 28 and the gear wheel 27 are mounted on a shaft 31. The constant-speed motor 24 may be energized from any suitable source, as, for example, the electrical circuit, the energy of which is to be measured. The rotation of the arm 21 periodically lifts the arm 19 to disengage the worm wheel 10 from the worm pinion 5 but these members are again brought into engagement, as soon as the arm 21 permits, by a spring 32 secured to an end of the arm 19 and a portion 33 of the frame of the meter.

The maximum travel of the demand pointer 11 is shown by the position of an indicating pointer 34 coacting with, or playing over, a suitably calibrated scale 35 on the face of the register 6. The indicating pointer 34 is frictionally retained on its supporting shaft 34a in any position to which it may be moved. The demand pointer 11 moves the indicating pointer 34 by contact of the former with an extension 36 with which the latter is provided.

It may readily be seen that it is possible to return the pointers 11 and 34 to or toward zero at any selected time, as, for example, when the demand pointer 11 is in the position shown. In accordance with my invention, it is not necessary, when the pointers 11 and 34 are to be reversely moved, as aforesaid, to wait until the end of the predetermined time interval when the driving connection between the worm pinion 5 and the worm wheel 10 is broken.

To the end that both of the pointers 11 and 34 may be re-set at any time, I provide a novel spring-biased toggle 37 so mounted on a shaft 38 that the worm pinion 5 and the worm wheel 10 are held out of engagement during the re-setting operation.

A member 39 is secured to the shaft 38 for engagement with a lateral extension 40 of the arm 19. The member 39 is adapted to engage the extension 40 and move the arm 19 in a counter-clockwise direction to disengage the worm wheel 10 from the worm pinion 5 when the shaft 38 is rotated in a clockwise direction.

The spring toggle 37, constructed in accordance with my invention, comprises an arm 41 secured to the shaft 38 and provided with a rotatably movable member 42 connected thereto by a rod 43. The rod 43 is secured to the member 41, and the member 42 is pivoted to the rod 43 by a screw 44. The outer portion of the member 42 is provided with a curved slot 47 to receive the shaft 38 in such manner that the rotational movement of the former is limited, both in a clockwise and in a counter-clockwise direction. A spring 45 is secured to a portion 46 of the frame of the meter and to substantially the central portion of the member 42 in such manner that either end of the slot will be moved into, and held in, engagement with the shaft 38, when the member 42 is moved beyond its central position with respect to the rod 43.

A member 48 having arms 49 and 50, is secured to the shaft 38 to be engageable by a member 51 when the latter is rotatively moved. The member 51 is secured to a shaft 52 that is rotatably mounted in the front portion of the meter casing (not shown) and is provided with a thumb piece 53, located outside the meter casing, for manually turning the member 51. The member 51, in addition to being movable into engagement with the arms 49 and 50, is adapted to engage the indicating pointer 34 and the demand pointer 11 when turned in a counter-clockwise direction by means of the thumb piece 53 for the purpose of returning the pointers to a predetermined initial position.

For purposes of illustration, let us suppose that it is desired to re-set the pointers to zero, the pointers and the mechanical portions of the device being in the positions and mechanical engagements illustrated in the drawing. In such case, the thumb piece 53 is turned in a counter-clockwise direction toward the pointers 11 and 34. Before engaging the pointers 11 and 34, however, the member 51 engages the arm 49 thereby turning the shaft 38 in a clockwise direction of rotation. The arm 41 is moved thereby in a clockwise direction which, in turn, moves the member 42 until the line joining the rod 43 and the point 46 is on the left-hand side of the shaft 38. After this position has been passed, the spring 45 snaps the right-hand extremity of the slot 47 of the member 42 into engagement with the shaft 38, turning the member 39 into its extreme position of rotative movement, which causes the member 39 to engage the extension 40 of the arm 19 and releases the engagement between the worm pinion 5 and the worm wheel 10. Such position of the driving mechanism permits the weighted member 16 to immediately return the demand pointer 11 to its zero position. By a continued turning of the thumb piece 53 in a counter-clockwise direction, an engagement of the member 51 with the indicating pointer 34 is effected and the latter is returned to engagement with the demand pointer 11 which has already been returned to zero, as hereinbefore explained.

After the pointer 34 has been re-set, the thumb piece 53 is turned in a clockwise direction, whereby it engages the arm 50 that has been moved into the path of travel of the member 51 by the action of the spring-biased toggle 37, as hereinbefore set forth. The arm 50, when turned in a counter-clockwise direction, turns the shaft 38 in a counter-clockwise direction, thereby causing the spring-biased toggle 37 to snap the left-hand end of the slot 47 of the member 42 into engagement with the shaft 38, which action causes the member 39 to release its engagement with the extension 40 of the arm 19, permitting the worm wheel 10 to re-engage the worm pinion 5 so that the latter continues to drive the demand pointer 11 in a normal manner.

I am aware that many changes may be made in my invention without departing from the spirit thereof and I desire that all such modifications and changes shall be within the scope of the appended claims.

I claim as my invention:

1. In a maximum-demand meter comprising a rotating meter element, a train of gears driven by said element, a pointer connected to said gear train, means, including a timing device, for periodically disconnecting elements of said gear train to permit said pointer to return to an initial position, and a second pointer advanced by said first pointer for indicating the maximum deflection of the latter, the combination with a thumb piece having a finger for engagement with said second pointer for resetting the same, of means for disconnecting elements of said gear train to permit said first pointer to return to an initial position whereby said second pointer may be reset with said thumb piece at any time, including a shaft having two extensions fixed thereto, one of which is always in the path of travel of said finger, means for biasing said shaft into either one of two angularly related positions, and means associated with said shaft for performing said disconnecting function when said shaft is in one of said positions.

2. In a maximum-demand meter comprising a rotating meter element, a train of gears driven by said element, a pointer connected to said gear train, means, including a timing device, for periodically disconnecting elements of said gear train to permit said pointer to return to an initial position, and a second pointer advanced by said first pointer for indicating the maximum deflection of the latter, the combination with a thumb piece having a finger for engagement with said second pointer for resetting the same, of means for disconnecting elements of said gear train to permit said first pointer to return to an initial position whereby said second pointer may be reset with said thumb piece at any time, including a shaft, extensions angularly disposed with respect to each other mounted on said shaft so that one of said extensions is always in the path of travel of the finger of said thumb piece, a spring for biasing said shaft against either one of two angularly disposed stops, and a lever mounted on said shaft for tripping open said elements when said shaft is biased against one of said stops.

3. In a maximum-demand meter comprising a driving pointer having a periodical disconnecting means for returning it to zero and a pointer driven by said driving pointer for indicating the maximum travel thereof, the combination with a member for engagement with said pointers, of means for operating said periodical disconnecting means of said driving pointer, including a pivoted shaft having spurs thereon, at least one of said spurs being always in the path of said member, means for biasing said shaft into either one of two angularly related positions, and means on said shaft engaging said disconnecting means when said shaft is in one of said positions.

4. In a device having a member periodically advanced from an initial position by driving means and means for indicating the maximum advancement of said member, the combination with means for manually resetting said member and said means at any time including a toggle associated with said member for locking it into or out of connection with its driving means, and a turnable finger for operating said toggle to lock said member out of engagement with its driving means and for returning said member and said means to an initial position when said finger is turned in one direction and for operating said toggle to lock said member into engagement with its driving means when turned in the opposite direction.

5. In a maximum-demand meter, a movable meter member, a demand element driven thereby, a maximum element driven by the demand element and means for resetting said elements including means for disconnecting the demand element from the movable meter member, means for operating said resetting means, and means for holding said disconnecting means in a position in which the demand element is connected to the meter member or in a position in which the demand element is disconnected from the meter member.

6. In a maximum-demand meter, a movable meter member, a demand element driven thereby, a maximum element driven by the demand element, and means for resetting said elements including means for disconnecting the demand element from the movable meter member, a single member for operating said resetting means, and means for holding said disconnecting means in positions, respectively, in which the demand element is connected to the meter member and disconnected therefrom, said operating member operating, in one direction, to actuate said disconnecting means to said independently held disconnecting position or to reset the maximum element and, in the opposite direction, to actuate the disconnecting means to said independently held connecting position.

7. In a maximum-demand meter, a movable meter member, a demand pointer, a gear train between said member and said pointer, means for disconnecting elements of said gear train, time-operated means for actuating said disconnecting means, means for returning said demand pointer to initial position when disconnected from the movable meter member, a maximum pointer driven by said demand pointer, and means for manually actuating said disconnecting means and returning said maximum pointer to initial position including a single operating handle, and additional resilient means for holding said disconnecting means in positions, respectively, in which the demand pointer is connected to the meter member or disconnected therefrom.

8. In a maximum-demand meter, a movable meter member, a demand pointer, a gear train between said member and said pointer, means for disconnecting elements of said gear train, time-operated means for actuating said disconnecting means, means for returning said demand pointer to initial position when disconnected from the movable meter member, a maximum pointer driven by said demand pointer, and means for manually actuating said disconnecting means and returning said maximum pointer to initial position including a single operating handle, a shaft, a pivot support mounted on the shaft, a member pivoted to said support and having a slot in which the shaft is disposed, a spring connected between said pivoted member and a stationary part of the meter, a pair of arms secured to the shaft, and an arm connected to the handle for actuating said arms and moving the maximum pointer.

9. In combination, a shaft, a support mounted thereon, a member pivotally mounted on said support and having a slot in which the shaft is disposed, a stationary member, a spring between said pivotally-mounted and stationary members, arms projecting radially from the shaft, and a pivotally-movable lever movable in a path to actuate one of said arms in one direction and another of said arms in the opposite direction.

In testimony whereof, I have hereunto subscribed my name this 20th day of July 1927.

BERT G. LA BAR.